(12) United States Patent
Guo

(10) Patent No.: US 9,241,272 B2
(45) Date of Patent: Jan. 19, 2016

(54) ACCESS CONTROL METHOD AND DEVICE

(71) Applicant: DATANG MOBILE COMMUNICATIONS EQUIPMENT CO., LTD, Beijing (CN)

(72) Inventor: Junli Guo, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 14/379,491

(22) PCT Filed: Nov. 23, 2012

(86) PCT No.: PCT/CN2012/085183
§ 371 (c)(1),
(2) Date: Aug. 18, 2014

(87) PCT Pub. No.: WO2013/120370
PCT Pub. Date: Aug. 22, 2013

(65) Prior Publication Data
US 2015/0031339 A1    Jan. 29, 2015

(30) Foreign Application Priority Data
Feb. 17, 2012 (CN) .......................... 2012 1 0036408

(51) Int. Cl.
*H04M 1/66* (2006.01)
*H04W 12/08* (2009.01)
*H04W 48/04* (2009.01)
*H04W 56/00* (2009.01)
(Continued)

(52) U.S. Cl.
CPC ................ *H04W 12/08* (2013.01); *H04W 8/08* (2013.01); *H04W 48/04* (2013.01); *H04W 56/0005* (2013.01); *H04W 76/02* (2013.01); *H04W 56/0045* (2013.01)

(58) Field of Classification Search
CPC .......... H04W 74/0833; H04W 72/042; H04W 72/0406; H04W 72/04; H04W 48/08; H04W 72/0413; H04L 5/001; H04B 7/0452
USPC ........................................................ 455/411
See application file for complete search history.

(56) References Cited

U.S. PATENT DOCUMENTS

2010/0085926 A1 *  4/2010  Harada et al. ................ 370/329
2010/0190509 A1 *  7/2010  Davis ................. H04W 56/006
                                                         455/456.1
(Continued)

FOREIGN PATENT DOCUMENTS

CN       101115290 A      1/2008
CN       201063813 Y      5/2008
(Continued)

*Primary Examiner* — Don N Vo
(74) *Attorney, Agent, or Firm* — Gokalp Bayramoglu

(57) ABSTRACT

An access control method and device, wherein the method comprises: a wireless access device receiving a request message from a user equipment (UE), the request message carrying timing advance information; and the wireless access device controlling the access of the UE according to the timing advance information. In embodiments of the present application, the wireless access device acquires the timing advance information of the UE during an RRC connection establishment process or a cell updating process, thus performing access control to the UE based on the timing advance information of the UE, and thereby timely controlling the access of the UE.

18 Claims, 4 Drawing Sheets

(51) Int. Cl.
*H04W 8/08* (2009.01)
*H04W 76/02* (2009.01)

(56) References Cited

U.S. PATENT DOCUMENTS

2011/0228680 A1* 9/2011 Ball et al. ..................... 370/241
2012/0149430 A1* 6/2012 Siomina et al. ............... 455/525
2014/0204843 A1* 7/2014 Larsson et al. ................ 370/329
2014/0328309 A1* 11/2014 Comstock ..................... 370/329

FOREIGN PATENT DOCUMENTS

CN 101835224 A 9/2010
CN 102573011 A 7/2012

* cited by examiner

ACCESS CONTROL METHOD AND DEVICE

This present application claims priority from Chinese Patent Application No. 201210036408.5, titled "Access Control Method and Device", filed to State Intellectual Property Office of the P.R.C on Feb. 17, 2012, the entire contents of which are incorporated herein by reference.

TECHNICAL FIELD

The present application relates to communication technology field, and particularly to an access control method and device.

BACKGROUND ART

User Equipment (UE), when initiating a service, first establishes a Radio Resource Control (RRC) connection with a Radio Network Controller (RNC) of a wireless access network; subsequently, the UE establishes a signaling connection with a core network, to perform processes of registration, calling, short message transmission and etc.

In the prior art, a distance between a UE and a base station is characterized by timing advance, and the UE would report a measurement result of the timing advance to a RNC according to a request of the RNC only after an RRC connection is established. Therefore, access control of the UE based on location would proceed upon that the establishment of the RRC connection is completed.

In carrying out the present application, the inventor has found at least the following problems exist in the prior art:

The RNC would acquire location information of the UE after the RRC connection is established, in order to judge whether to accept the UE according to the location information; during the RNC acquiring the location information, the UE would simultaneously interact with the core network (such as performing registration processes, short message transmission processes and etc.); if the UE would not report the location information timely or the signaling interaction delay between the UE and the core network is short, the RNC might not acquire the location information of the UE while the registration process (or the short message transmission process) of the UE has ended, resulting in that the RNC cannot control the access of the UE timely.

SUMMARY OF THE INVENTION

An access control method and device are provided by the embodiments of the present application, to timely control the access of the UE.

In order to achieve one of the above objects, an embodiment of the present application is to provide an access control method, comprising:
a wireless access device receiving a request message from a user equipment, the request message carrying timing advance information; and
the wireless access device controlling the access of the user equipment according to the timing advance information.

Preferably, the step of the wireless access device controlling the access of the user equipment according to the timing advance information comprises: the wireless access device judging whether the timing advance information satisfies a condition of restricted access, and if so, rejecting the access of the user equipment; otherwise, allowing the access of the user equipment.

Preferably, the step of the wireless access device controlling the access of the user equipment according to the timing advance information comprises:
the wireless access device determining location information of the user equipment according to the timing advance information, and controlling the access of the user equipment according to the location information.

Preferably, the step of the wireless access device controlling the access of the user equipment according to the location information comprises:
the wireless access device judging whether the location information satisfies a condition of restricted access, and if so, rejecting the access of the user equipment; otherwise, allowing the access of the user equipment.

Preferably, the step of the wireless access device controlling the access of the user equipment according to the timing advance information comprises:
the wireless access device determining Angle of Arrival, AOA, information corresponding to the user equipment, and controlling the access of the user equipment according to the timing advance information and the AOA information.

Preferably, the step of the wireless access device controlling the access of the user equipment according to the timing advance information and the AOA information comprises:
the wireless access device judging whether the timing advance information and the AOA information all satisfy a condition of restricted access, and if so, rejecting the access of the user equipment; otherwise, allowing the access of the user equipment.

Preferably, the step of the wireless access device controlling the access of the user equipment according to the timing advance information comprises:
the wireless access device determining location information of the user equipment according to the timing advance information, and determining AOA information corresponding to the user equipment; and
the wireless access device controlling the access of the user equipment according to the location information and the AOA information.

Preferably, the step of the wireless access device controlling the access of the user equipment according to the location information and the AOA information comprises:
the wireless access device judging whether the location information and the AOA information all satisfy a condition of restricted access, and if so, rejecting the access of the user equipment; otherwise, allowing the access of the user equipment.

Preferably, the step of the wireless access device controlling the access of the user equipment according to the timing advance information comprises:
the wireless access device further acquiring time calibration information corresponding to the timing advance information, and using the time calibration information to control the access of the user equipment.

Preferably, the request message includes: a Radio Resource Control, RRC, connection establishment request message; a cell updating request message; and a User Registration Area, URA, updating message.

An embodiment of the present application is to provide an access control method, comprising:
a user equipment determining timing advance information; and
the user equipment sending a request message to a wireless access device, the request message carrying the timing advance information Preferably, the request message includes: a Radio Resource Control, RRC, connection establishment request message; a cell updating request message; and a User Registration Area, URA, updating message.

An embodiment of the present application is to provide a wireless access device, comprising:
a receiving module, configured to receive a request message from a user equipment, the request message carrying timing advance information; and
a controlling module, configured to control the access of the user equipment according to the timing advance information.

Preferably, the controlling module is particularly configured to judge whether the timing advance information satisfies a condition of restricted access, and if so, reject the access of the user equipment; otherwise, allow the access of the user equipment.

Preferably, the controlling module is particularly configured to determine location information of the user equipment according to the timing advance information, and control the access of the user equipment according to the location information.

Preferably, the controlling module is further configured to judge whether the location information satisfies a condition of restricted access, and if so, reject the access of the user equipment; otherwise, allow the access of the user equipment.

Preferably, the controlling module is particularly configured to determine Angle of Arrival, AOA, information corresponding to the user equipment, and control the access of the user equipment according to the timing advance information and the AOA information.

Preferably, the controlling module is further configured to judge whether the timing advance information and the AOA information all satisfy a condition of restricted access, and if so, reject the access of the user equipment; otherwise, allow the access of the user equipment.

Preferably, the controlling module is particularly configured to determine location information of the user equipment according to the timing advance information, and determine AOA information corresponding to the user equipment; and control the access of the user equipment according to the location information and the AOA information.

Preferably, the controlling module is further configured to judge whether the location information and the AOA information all satisfy a condition of restricted access, and if so, reject the access of the user equipment; otherwise, allow the access of the user equipment.

Preferably, the controlling module is further configured to acquire time calibration information corresponding to the timing advance information, and use the time calibration information to control the access of the user equipment.

Preferably, the request message includes: a Radio Resource Control, RRC, connection establishment request message; a cell updating request message; and a User Registration Area, URA, updating message.

An embodiment of the present application is to provide a user equipment, comprising:
a determining module, configured to determine timing advance information; and
a sending module, configured to send a request message to a wireless access device, the request message carrying the timing advance information.

Preferably, the request message includes: a Radio Resource Control, RRC, connection establishment request message; a cell updating, request message; and a User Registration Area, URA, updating message.

An embodiment of the present application is to provide a computer-readable recording medium in which a program for executing the above methods is recorded.

Compared with the prior art, the embodiments of the present application have at least the following advantages: in the embodiments of the present application, a wireless access device may acquire timing advance information of the UE (or location information of the UE) during an RRC connection establishment process or a cell updating process rather than acquire the timing advance information of the UE (or the location information of the UE) after an RRC connection establishment process or a cell updating process, thus performing access control to the UE based on the timing, advance information of the UE (or the location information of the UE), and then timely controlling the access of the UE.

BRIEF DESCRIPTION OF DRAWINGS

In order to more clearly explain the technical solutions of the present application, the accompanying drawings required in the description of the embodiments will be simply introduced hereinafter. Obviously, the accompanying drawings described hereinafter are merely some embodiments of the present application, and it should be noted by an ordinary person skilled in the art that other drawings may be obtained on the basis of these drawings without paying creative efforts.

DETAILED DESCRIPTION OF EMBODIMENTS

In carrying out the present application, the inventor has found: a RNC would necessarily query location information of a UE after the UE established a RRC connection, wait for the UE (and a base station) to report a measurement result, and calculate the location information of the UE according to the measurement result, thereby judging whether to accept the UE according to the location information. Further, after the RRC connection is established, during the process of the RNC querying location of the UE, it is required that the UE simultaneously interact with the core network (such as, performing registration process and short message transmission process) and thus, if the UE would not report timely, or in the case that a safe mode control is not enabled on the network side, the signaling interaction delay between the UE and the core network is short, the RNC might not query the location information of the UE while the registration process (or the short message transmission process) of the UE has ended, resulting in that the RNC cannot control the access of the UE timely at this time.

For the above findings, the embodiments of the present application are to provide an access control method and device, such that a wireless access device may acquire timing advance information of the UE (or location information of the UE) during an RRC connection establishment process or a cell updating process rather than acquiring the timing advance information of the UE (or the location information of the UE) after an RRC connection establishment process or a cell updating process, thus performing access control to the UP based on the timing advance information of the UE (or the location information of the UE), and then timely controlling the access of the UE.

Hereinafter, technical solutions of the present application will be clearly and fully described in conjunction with the accompanying drawings of the present application. Obviously, the described embodiments are only part but not all of the embodiments of the application. Based on the embodiments of the present application, all other embodiments obtained by an ordinary person skilled in the art without paying creative efforts will fall into the protection scope of the present application.

First Embodiment

Figure 1:
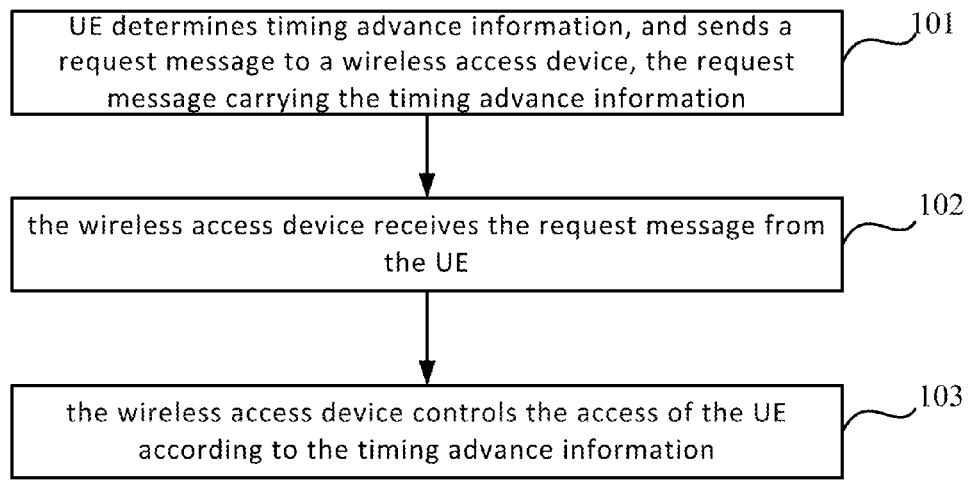
FIG. 1 is a schematic drawing of a flow of an access control method according to a first embodiment of the present application.

The first embodiment of the present application is to provide an access control method, such that a wireless access device can timely acquire timing advance information of a UE and control the access of the UE based on the timing advance (equivalent to round trip delay between the UE and the wireless access devices, which can be used to calculate the distance between the UE and the wireless access device) information; application scenarios of the method may include but not be limited to: Time Division-Synchronous Code Division Multiple Access (TD-SCDMA) system and Long Term Evolution (LTE) system. As shown in FIG. 1, the method may comprise the following steps:

Step 101, a UE determines timing advance information, and sends a request message to a wireless access device, the request message carrying the timing advance information.

In the embodiment of the present application, the request message may include but not be limited to: an RRC connection establishment request message; a cell updating request message; and a User Registration Area (URA) updating message.

Step 102, the wireless access device receives the request message from the UE.

Step 103, the wireless access device controls the access of the UE according to the timing advance information.

In the embodiment of the present application, the process of the wireless access device controlling the access of the UE according to the timing advance information can adopt the following modes:

In first mode, the wireless access device controls the access of the UE according to the timing advance information.

Specifically, the wireless access device judges whether the timing, advance information satisfies a condition of restricted access, and if so, rejects the access of the UE; otherwise, allows the access of the UE. When judging whether the timing advance information satisfies the condition of restricted access, it may judge whether the timing advance is greater than a preset time threshold (which can be selected based on practical experience), or, may judge whether the timing advance is less than a preset time threshold (which can be selected based on practical experience).

In the embodiment of the present application, a preferred implementation mode is as follows: the wireless access device may acquire time calibration information corresponding to the timing, advance information, and use the time calibration information to control the access of the UE. Specifically, the wireless access device judges whether the time calibration information satisfies a condition of restricted access, and if so, rejects the access of the UE; otherwise, allows the access of the UE.

In second mode, the wireless access device determines location information of the UE according to the timing advance information, and controls the access of the UE according to the location information.

Specifically, the wireless access device determines location information of the UE according to the timing advance information, and judges whether the location information satisfies a condition of restricted access, and if so, rejects the access of the UE; otherwise, allows the access of the UE. When judging whether the location information satisfies the condition of restricted access, it may judge whether the location information is greater than a preset distance threshold (which can be selected based on practical experience), or, may judge whether the location information is less than a preset distance threshold (which can be selected based on practical experience).

In the embodiment of the present application, a preferred implementation mode is as follows: the wireless access device may acquire time calibration information corresponding to the timing advance information, and use the time calibration information to control the access of the UE. Specifically, the wireless access device determines the location information of the UE according to the time calibration information, and judges whether the location information satisfies a condition of restricted access, and if so, rejects the access of the UE; otherwise, allows the access of the UE.

In third mode, the wireless access device determines Angle of Arrival (AOA, which refers to direction information of the UE) information corresponding to the UE, and controls the access of the TIE according to the timing advance information and the AOA information.

Specifically, the wireless access device judges whether the timing advance information and the AOA information all satisfy a condition of restricted access, and if so, rejects the access of the UE; otherwise, allows the access of the UE. When judging whether the timing advance information satisfies the condition of restricted access, it may judge whether the timing advance is greater than a preset time threshold (which can be selected based on practical experience), or, may judge whether the timing advance is less than a preset time threshold (which can be selected based on practical experience) when judging whether the AOA information satisfies the condition of restricted access, it may judge whether the AOA is within a preset range.

In the embodiment of the present application, a preferred implementation mode is as follows: the wireless access device may acquire time calibration information corresponding to the timing, advance information, and use the time calibration information to control the access of the UE. Specifically, the wireless access device judges whether the time calibration information and the AOA information all satisfy a condition of restricted access, and if so, rejects the access of the UE; otherwise, allows the access of the UE.

In fourth mode, the wireless access device determines location information of the UE according to the timing advance information, and determines AOA information corresponding to the UE; and the wireless access device controls the access of the UE according to the location information and the AOA information.

Specifically, the wireless access device determines location information of the UE according to the timing advance information, and judges whether the location information and the AOA information all satisfy a condition of restricted access, and if so, rejects the access of the UE; otherwise, allows the access of the UE. When judging whether the location information satisfies the condition of restricted access, it may judge whether the location information is greater than a preset distance threshold (which can be selected based on practical experience), or, may judge whether the location information is less than a preset distance threshold (which can be selected based on practical experience); when judging whether the AOA information satisfies the condition of restricted access, it may judge whether the AOA is within a preset range.

In the embodiment of the present application, a preferred implementation mode is as follows: the wireless access device may acquire time calibration information corresponding to the timing advance information, and use the time calibration information to control the access of the UE. Specifically, the wireless access device determines location information of the UE according to the time calibration information, and judges whether the location information and the AOA information all satisfy a condition of restricted access, and if so, rejects the access of the UE; otherwise, allows the access of the UE.

In conclusion, in the embodiment of the present application, the wireless access device may acquire the timing advance information of the UE (or the location information of the UE) during the RRC connection establishment process or the cell updating process, thus performing access control to the UE based on the timing advance information of the UE (or the location information of the UE), and then timely controlling the access of the UE.

Further, in a mobile communication network, because of some special reasons (for example, national boundaries, military areas, etc.), it is necessary that UE access is forbidden in a related area. By determining the distance (which is embodied as a timing advance measured by the UE) between the UE and the wireless access device and the location of the wireless access device, the location information of the UE can be acquired, and thereby the UE access can be controlled.

Figure 2:
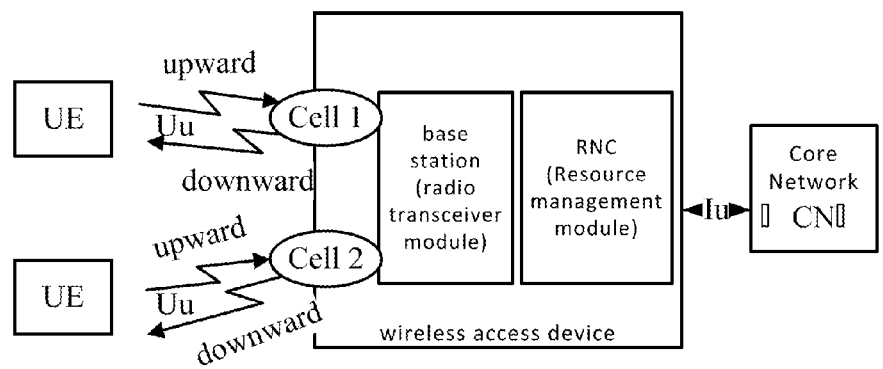
FIG. 2 is a schematic drawing of an application scenario of the embodiments of the present application.

Hereinafter, the embodiment of the present application will be further described in connection with the application scenario as shown in FIG. 2.

As shown in FIG. 2, the wireless access device consists of a base station and a RNC, wherein the base station is a radio transceiver module of the wireless access device, the RNC is a resource management module of the wireless access device; the wireless access device can control multiple cells, and the UE establishes a connection with the network side through radio resource of the cells. In the wireless access device, the resource management module is configured to control the radio resources of the cells, including allocation of resources for the UE, if the UE is rejected, then the UE will be informed by an air interface message to release the connection, etc.; the radio transceiver module is configured to receive data of the resource management module, forward the data which is processed to the UE, to receive data from the UE, and forward the data which is processed to the resource management module. In addition, the resource management module may also receive data from a Core Network (CN) through an Iu interface and send data of the UE to the CN.

Second Embodiment

Figure 3:
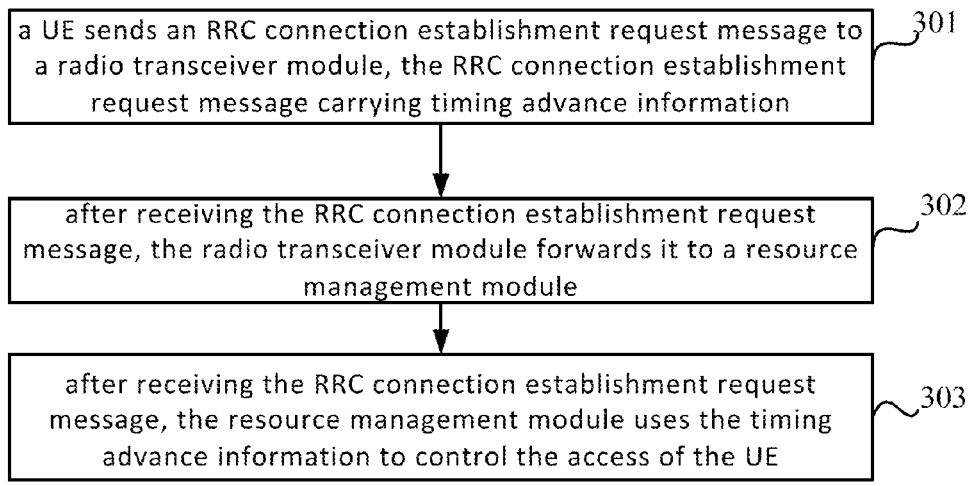
FIG. 3 is a schematic drawing of a flow of an access control method according to a second embodiment of the present application.

Based on the application scenario of FIG. 2, the second embodiment of the present application is to provide an access control method which can be applied to a TD-SCDMA system and a LTE system. As shown in FIG. 3, the method may comprise the following steps:

Step 301, a UE sends an RRC connection establishment request message radio transceiver module, the RRC connection establishment request message carrying timing advance information (TA information).

Step 302, after receiving the RRC connection establishment request message, the radio transceiver module forwards it to a resource management module.

In a preferred implementation mode, the radio transceiver module may also acquire time calibration information of the timing advance of the UE, and forward the time calibration information and the RRC connection establishment request message to the resource management module.

Step 303, after receiving the RRC connection establishment request message, the resource management module uses the timing advance information to control the access of the UE.

In a preferred implementation mode, the resource management module may also use the time calibration information (which can be received from the radio transceiver module, or obtained by the resource module itself) of the timing advance to control the access of the UE.

Specifically, the resource management module judges whether the timing advance of the UE satisfies a condition of restricted access (fox example, the timing advance is greater than a threshold, or the timing advance is less than a threshold); if the condition of restricted access is satisfied, the access of the UE will be rejected and an RRC rejection message may be sent to the UE through the radio transceiver module; if the condition of restricted access is not satisfied, radio resources will be allocated for the UE and an RRC establishment message may be sent to the UE through the radio transceiver module.

Further, the resource management module may also use the timing advance information to acquire location information of the UE (such as the distance between the UE and the radio transceiver module), and judge whether the location information of the UE satisfies a condition of restricted access; if the condition of restricted access is satisfied, the access of the UE will be rejected and an RRC rejection message may be sent to the UE through the radio transceiver module; if the condition of restricted access is not satisfied, radio resources will be allocated for the UE and an RRC establishment message may be sent to the UE through the radio transceiver module.

Third Embodiment

Figure 4:
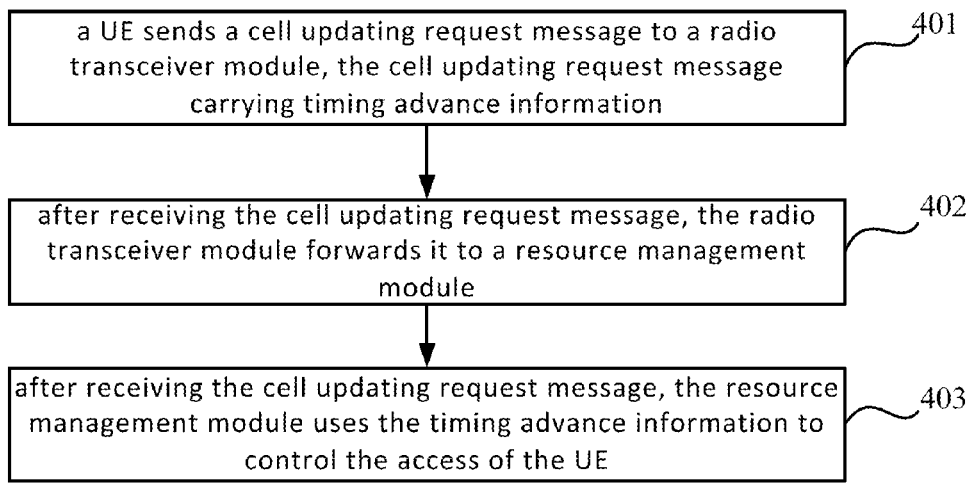
FIG. 4 is a schematic drawing of a flow of an access control method according to a third embodiment of the present application.

Based on the application scenario of FIG. 2, the third embodiment of the present application is to provide an access control method which can be applied to a TD-SCDMA system. As shown in FIG. 4, the method may comprise the following steps:

Step 401, after establishing an RRC connection of a UE, if a cell updating (for example, a cell updating caused by wireless link failure, or a cell updating caused by changing cell, etc.) occurs during movement of the UE, the UE sends a cell updating request message to a radio transceiver module, the cell updating request message carrying timing advance information (TA information).

Step 402, after receiving the cell updating request message, the radio transceiver module forwards it to a resource management module.

In a preferred implementation mode, the radio transceiver module may also obtain time calibration information of the timing advance of the UE, and forward the time calibration information and the cell updating request message to the resource management module.

Step 403, after receiving the cell updating request message, the resource management module uses the timing advance information to control the access of the UE.

In a preferred implementation mode, the resource management module may also use the time calibration information (which can be received from the radio transceiver module, or obtained by the resource module itself) of the timing advance to control the access of the UE.

Specifically, the resource management module judges whether the timing advance of the UE satisfies a condition of restricted access fox example, the timing advance is greater than a threshold, or the timing advance is less than a threshold); if the condition of restricted access is satisfied, the RRC connection of the UE may be released and an RRC release message may be sent to the UE through the radio transceiver module; if the condition of restricted access is not satisfied, radio resources will be allocated for the UE and a cell updating confirmation message may be sent to the UE through the radio transceiver module.

Further, the resource management module may also use the timing advance information to acquire location information of the UE (such as the distance between the UE and the radio transceiver module), and judge whether the location information of the UE satisfies a condition of restricted access; if the condition of restricted access is satisfied, the RRC connection of the UE may be released and an RRC release message may be sent to the UE through the radio transceiver module; if the condition of restricted access is not satisfied, radio resources will be allocated for the UE and a cell updating confirmation message may be sent to the UE through the radio transceiver module.

Fourth Embodiment

Figure 5:
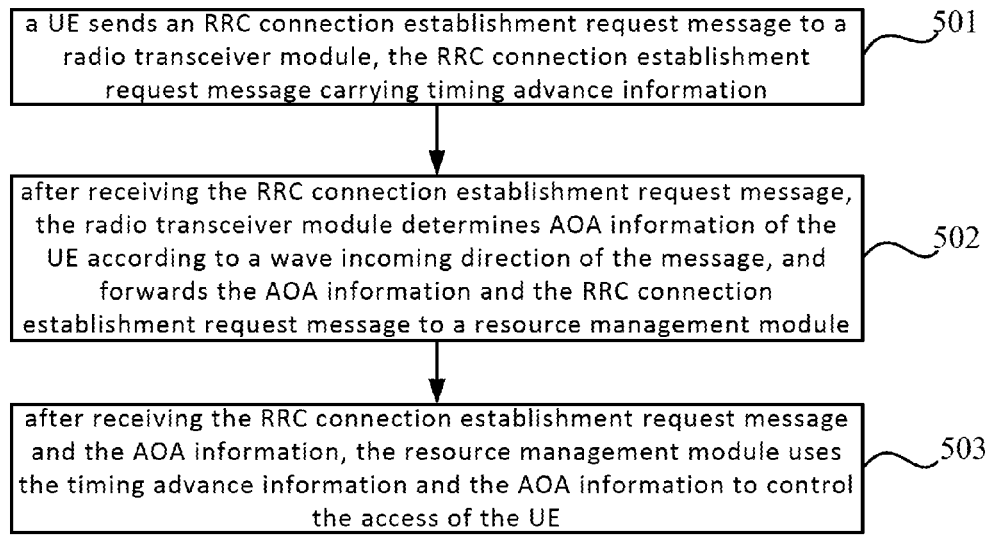
FIG. 5 is a schematic drawing of a flow of an access control method according to a fourth embodiment of the present application.

Based on the application scenario of FIG. 2, the fourth embodiment of the present application is to provide an access control method, which can be applied to a TD-SCDMA system and a LTE system. As shown in FIG. 5, the method may comprise the following steps:

Step 501, a UE sends an RRC connection establishment request message to a radio transceiver module, the RRC connection establishment request message carrying timing advance information (TA information).

Step 502, after receiving the RRC connection establishment request message, the radio transceiver module determines AOA information of the UE according to a wave incoming direction of the message, and forwards the AOA information and the RRC connection establishment request message to a resource management module.

In a preferred implementation mode, the radio transceiver module may also acquire time calibration information of the timing advance of the UE, and forward the time calibration information, the AOA information and the RRC connection establishment request message to the resource management module.

Step 503, after receiving the RRC connection establishment request message and the AOA information, the resource management module uses the timing advance information and the AOA information to control the access of the UE.

In a preferred implementation mode, the resource management module may also use the time calibration information (which can be received from the radio transceiver module, or obtained by the resource module itself) of the timing advance and the AOA information to control the access of the UE.

Specifically, the resource management module judges whether the timing advance of the UE and the AOA information satisfy a condition of restricted access (fox example, the timing advance satisfies a certain condition, and or the AOA information falls in between a certain range); if the condition of restricted access is satisfied, the access of the UE will be rejected and an RRC rejection message may be sent to the UE through the radio transceiver module; if the condition of restricted access is not satisfied, radio resources will be allocated for the FE and an RRC establishment message may be sent to the UE through the radio transceiver module.

Further, the resource management module may also use the timing advance information to acquire location information of the FE (such as the distance between the UE and the radio transceiver module), and judge whether the location information of the FE and the AOA information satisfy a condition of restricted access; if the condition of restricted access is satisfied, the access of the FE will be rejected and an RRC rejection message may be sent to the FE through the radio transceiver module; if the condition of restricted access is not satisfied, radio resources will be allocated for the FE and an RRC establishment message may be sent to the FE through the radio transceiver module.

Fifth Embodiment

Figure 6:
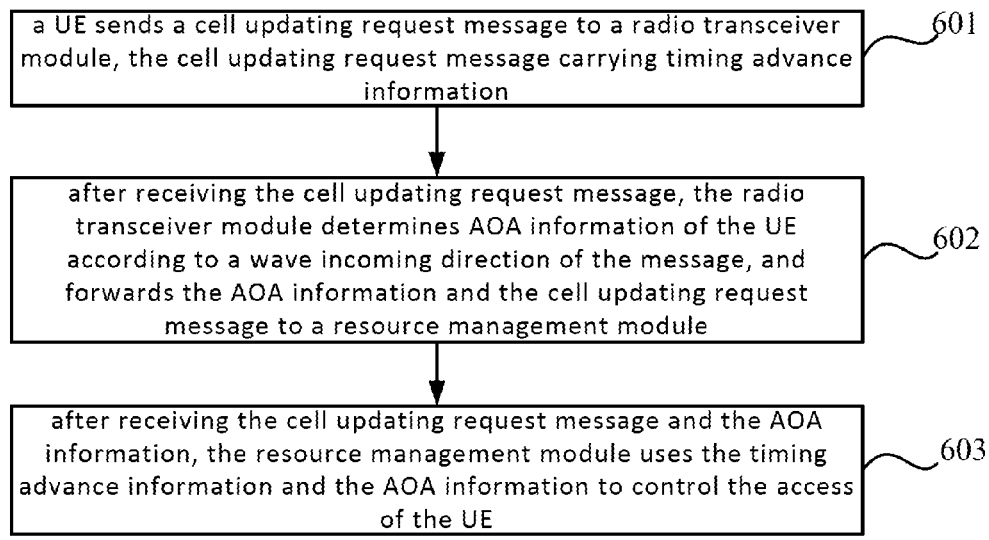
FIG. 6 is a schematic drawing of a flow of an access control method according to a fifth embodiment of the present application.

Based on the application scenario of FIG. 2, the fifth embodiment of the present application is to provide an access control method which can be applied to a TD-SCDMA system. As shown in FIG. 6, the method may comprise the following steps:

Step 601, after establishing an RRC connection of a UE, if a cell updating (for example, a cell updating caused by wireless link failure, or a cell updating caused by changing cell, etc.) occurs during movement of the UE, the UE sends a cell updating request message to a radio transceiver module, the cell updating request message carrying timing advance information (TA information).

Step 602, after receiving the cell updating request message, the radio transceiver module determines AOA information of the UE according to a wave incoming direction of the message, and forwards the AOA information and the cell updating request message to a resource management module.

In a preferred implementation mode, the radio transceiver module may also acquire time calibration information of the timing advance of the UE, and forward the time calibration information, the AOA information and the cell updating request message to the resource management module.

Step 603, after receiving the cell updating request message and the AOA information, the resource management module uses the timing advance information and the AOA information to control the access of the UE.

In a preferred implementation mode, the resource management module may also use the time calibration information (which can be received from the radio transceiver module, or obtained by the resource module itself) of the timing advance and the AOA information to control the access of the UE.

Specifically, the resource management module judges whether the timing advance of the UE and the AOA information satisfy a condition of restricted access (fox example, the timing advance satisfies a certain condition, and the AOA information falls in between a certain range); if the condition of restricted access is satisfied, the RRC connection of the UE will be released and an RRC release message may be sent to the UE through the radio transceiver module; if the condition of restricted access is not satisfied, radio resources will be allocated for the UE and a cell updating confirmation message may be sent to the UE through the radio transceiver module.

Further, the resource management module may also use the timing advance information to acquire location information of the UE (such as the distance between the UE and the radio transceiver module), and judge whether the location information of the UE and the AOA information satisfy a condition of restricted access; if the condition of restricted access is satisfied, the RRC connection of the UE will be released and an RRC release message may be sent to the UE through the radio transceiver module; if the condition of restricted access is not satisfied, radio resources will be allocated for the UE and a cell updating confirmation message may be sent to the UE through the radio transceiver module.

Sixth Embodiment

Based on the same inventive concept as the methods described above, an embodiment of the present application is to provide a wireless access device.

Figure 7:
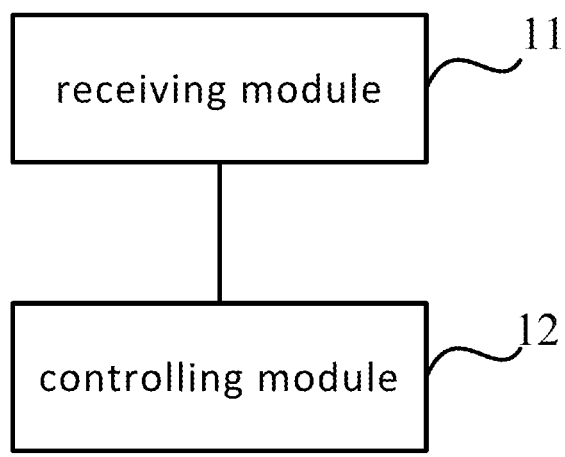
FIG. 7 is a schematic drawing of structure of a wireless access device according to a sixth embodiment of the present application.

As shown in FIG. 7, the wireless access device may comprise:
a receiving module 11, configured to receive a request message from a user equipment, the request message carrying timing advance information; and
a controlling module 12, configured to control the access of the user equipment according to the timing advance information.

The controlling module 12 may be particularly configured to judge whether the timing advance information satisfies a condition of restricted access, and if so, reject the access of the user equipment; otherwise, allow the access of the user equipment.

The controlling module 12 may be particularly configured to determine location information of the user equipment according to the timing advance information, and control the access of the user equipment according to the location information.

The controlling module 12 may be further configured to judge whether the location information satisfies a condition of restricted access, and if so, reject the access of the user equipment; otherwise, allow the access of the user equipment.

The controlling module 12 may be particularly configured to determine Angle of Arrival (AOA) information corresponding to the user equipment, and control the access of the user equipment according to the timing advance information and the AOA information.

The controlling module 12 may be further configured to judge whether the timing advance information and the AOA information all satisfy a condition of restricted access, and if so, reject the access of the user equipment; otherwise, allow the access of the user equipment.

The controlling module 12 may be particularly configured to determine location information of the user equipment according to the timing advance information, and determine AOA information corresponding to the user equipment; and control the access of the user equipment according to the location information and the AOA information.

The controlling module 12 may be further configured to judge whether the location information and the AOA information all satisfy a condition of restricted access, and if so, reject the access of the user equipment; otherwise, allow the access of the user equipment.

The controlling module 12 may be further configured to acquire time calibration information corresponding to the timing, advance information, and use the time calibration information to control the access of the user equipment.

In the embodiment of the present application, the request message may include:
a Radio Resource Control (RRC) connection establishment request message;
a cell updating request message; and
a User Registration Area (URA) updating message.

Herein, each of modules of the device of the present application can be integrally formed, or can be separately disposed. The above modules can be combined into a single module or can be further divided into several modules.

Seventh Embodiment

Figure 8:
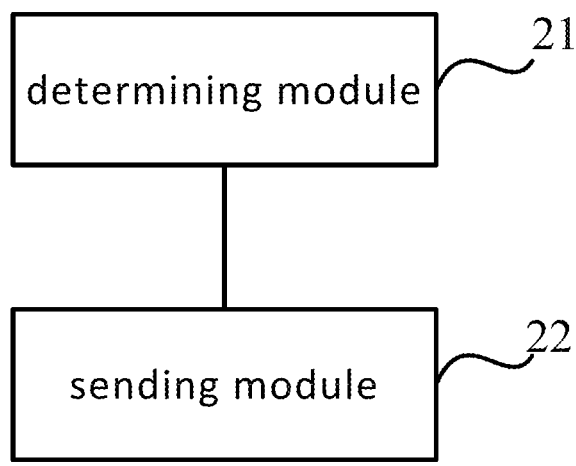
FIG. 8 is a schematic drawing of structure of a user equipment according to a seventh embodiment of the present application.

Based on the same inventive concept as the methods described above, an embodiment of the present application is to provide a user equipment. As shown in FIG. 8, the user equipment may comprise:
a determining module 21, configured to determine timing advance information; and
a sending module 22, configured to send a request message to a wireless access device, the request message carrying, the timing, advance information.

In the embodiment of the present application, the request message may include:
a Radio Resource Control (RRC) connection establishment request message;
a cell updating request message; and
a User Registration Area (URA) updating message.

Herein, each of modules of the user equipment of the present application can be integrally formed, or can be separately disposed. The above modules can be combined into a single module or can be further divided into several modules.

Eighth Embodiment

The eighth embodiment of the present application is to provide a computer-readable recording medium in which a program for executing the method embodiments is recorded.

The computer readable recording medium may include any mechanism which can be used to store or transmit information in a computer (for example, a person computer) readable form readable form. For example, machine-readable medium may include a Read Only Memory (ROM), a Random Access Memory (RAM), a magnetic disk storage media, an optical storage media, a flash memory media, a propagation signal in electrical, optical, acoustical or other forms (e.g., carrier wave, infrared signal, digital signal, etc).

The various embodiments in the description have been explained progressively. Each of embodiments only emphasizes the differences from one another, and the same or similar explanations of various embodiments could be made reference to each other. Since the device embodiment is substantially similar to the method embodiments, the explanations thereof are relatively brief and reference could be made to the related parts in the method embodiments.

It should be understood by an ordinary person skilled in the art that the embodiments of the present application may be provided as a method, a system or a computer program product. Therefore, the present application may employ forms of full hardware embodiment, full software embodiment or combination of software and hardware embodiment. Moreover, the present application may employ a form of computer program product that can be implemented as one or more computer useable storage media (including but not being limited to magnetic disk storage device, CD-ROM and optical storage device, etc.) containing computer useable program codes.

The present application has been described with reference to the flow charts and/or the block diagrams of the method, device (system) and computer program product according to the embodiments of the present application. It should be understood that each of steps and/or modules in the flow charts and/or the block diagrams and combination of steps and/or modules in the flow charts and/or the block diagrams may be implemented by computer program instructions. The computer program instructions may be provided for a general-purpose computer, a special-purpose computer, an embedded processor or processor of other programmable data processing device to form an apparatus, such that the instructions executed by the computer or the processor of other programmable data processing device may form a device for implementing function(s) as specified in one or more steps in the flow charts and/or one or more modules in the block diagrams.

The computer program instructions may also be stored in a computer readable storage device which is able to boot a computer or other programmable data processing device to work in a specified manner, such that the instructions stored in the computer readable storage device may form a product including command device(s), the command device(s) implementing function(s) as specified in one or more steps in the flow charts and/or one or more modules in the block diagrams.

The computer program instructions may also be installed in a computer or other programmable data processing device, such that the computer or other programmable data processing device may execute a series of operating steps to form processing implemented by the computer, and thereby the instructions executed in the computer or other programmable data processing device may provide steps for implementing function(s) as specified in one or more steps in the flow charts and/or one or more modules in the block diagrams.

Although the preferred embodiments of the present application have been described, other variations and modifications can be made to the embodiments by those persons skilled in the art upon understanding of the basic inventive concepts. Therefore, the appended claims are intended to be constructed as covering the preferred embodiments and all the variations and modifications fallen into the scope of the application.

Finally, it should be explained that the relational terms such as "first" and "second" herein are only used to distinguish an entity or operation from another entity or operation, but not necessarily require or suggest there exists any real relation or sequence between the entities or operations. Moreover, terms such as "include", "comprise" or any other variants are intended to cover non-exclusive containing, so that the process, method, object and device containing a series of elements not only include these elements but also include other elements that are not definitely listed or the inherent elements of the process, method, object and device. Unless otherwise specified, an element defined by wording "include a . . ." may not exclude additional same element existing in the process, method, object and device containing this element.

Through the above description of the embodiments, it should be clearly appreciated by the person skilled in the art that the present application may be implemented by means of software in connection with the required universal hardware platform, and of course, can also be implemented by hardware, but in many cases the former is a more preferred implementation. Based on this understanding, the essential part or the part contributing to the prior art of the technical solutions of the present application may be embodied as a form of software product. The computer software product may be stored in the storage medium, and comprise a plurality of instructions which could used to execute the methods as described in various embodiments of the present application by a computer device (that could be a personal computer, a server or a network equipment).

It should be appreciated by the person skilled in the art that the accompanying drawings are only schematic views of the preferred embodiments, and the modules or the processes in the accompanying drawings are not necessarily required to implement the present application.

It should be appreciated by the person skilled in the art that the modules of the devices in the embodiments may be disposed in the devices of the embodiments as described herein, or may be changed accordingly to be positioned in one or more different devices from that in the embodiments. The modules in the above embodiments can be combined in a single module or can be further divided into multiple modules.

The sequence numbers of the embodiments of the present application are only for the descriptive purpose but not represent the relative merits of the embodiments.

Disclosed above are only specific embodiments of the present application. However, the present application is not limited thereto. Any modifications which could be contemplated by the person skilled in the art will be fallen into protection scope of the present application.

The invention claimed is:

1. An access control method, comprising:
   a wireless access device receiving a request message from a user equipment before a Radio Resource Control (RRC) connection is established, the request message carrying timing advance information; and
   the wireless access device controlling the access of the user equipment according to the timing advance information;
   wherein the step of the wireless access device controlling the access of the user equipment according to the timing advance information further comprises:
   the wireless access device determining location information of the user equipment according to the timing advance information, and controlling the access of the user equipment according to the location information.

2. The method according to claim 1, wherein the step of the wireless access device controlling the access of the user equipment according to the timing advance information, comprises:
   the wireless access device judging whether the timing advance information satisfies a condition of restricted access, and if so, rejecting the access of the user equipment; otherwise, allowing the access of the user equipment.

3. The method according to claim 1, wherein the step of the wireless access device controlling the access of the user equipment according to the location information, comprises:
   the wireless access device judging whether the location information satisfies a condition of restricted access, and if so, rejecting the access of the user equipment; otherwise, allowing the access of the user equipment.

4. The method according to claim 1, wherein the step of the wireless access device controlling the access of the user equipment according to the timing advance information, comprises:
the wireless access device determining Angle of Arrival, AOA, information corresponding to the user equipment, and controlling the access of the user equipment according to the timing advance information and the AOA information.

5. The method according to claim 4, wherein the step of the wireless access device controlling the access of the user equipment according to the timing advance information and the AOA information, comprises:
the wireless access device judging whether the timing advance information and the AOA information all satisfy a condition of restricted access, and if so, rejecting the access of the user equipment; otherwise, allowing the access of the user equipment.

6. The method according to claim 1, wherein the step of the wireless access device controlling the access of the user equipment according to the timing advance information, comprises;
the wireless access device determining AOA information corresponding to the user equipment; and
the wireless access device controlling the access of the user equipment according to the location information and the AOA information.

7. The method according to claim 6, wherein the step of the wireless access device controlling the access of the user equipment according to the location information and the AOA information, comprises:
the wireless access device judging whether the location information and the AOA information all satisfy a condition of restricted access, and if so, rejecting the access of the user equipment; otherwise, allowing the access of the user equipment.

8. The method according to claim 1, wherein the step of the wireless access device controlling the access of the user equipment according to the timing advance information, comprises:
the wireless access device further acquiring time calibration information corresponding to the timing advance information, and using the time calibration information to control the access of the user equipment.

9. The method according to claim 1, wherein the request message includes: an RRC connection establishment request message; a cell updating request message; and a User Registration Area (URA) updating message.

10. A wireless access device, comprising:
a receiving module, configured to receive a request message from a user equipment before a Radio Resource Control (RRC) connection is established, the request message carrying timing advance information; and
a controlling module, configured to control the access of the user equipment according to the timing advance information,
wherein the controlling module is configured to determine location information of the user equipment according to the timing advance information, and control the access of the user equipment according to the location information.

11. The wireless access device according to claim 10, wherein the controlling module is configured to judge whether the timing advance information satisfies a condition of restricted access, and if so, reject the access of the user equipment; otherwise, allow the access of the user equipment.

12. The wireless access device according to claim 10, wherein the controlling module is further configured to judge whether the location information satisfies a condition of restricted access, and if so, reject the access of the user equipment otherwise, allow the access of the user equipment.

13. The wireless access device according to claim 10, wherein the controlling module is configured to determine Angle of Arrival, AOA, information corresponding to the user equipment, and control the access of the user equipment according to the timing advance information and the AOA information.

14. The wireless access device according to claim 13, wherein the controlling module is further configured to judge whether the timing advance information and the AOA information all satisfy a condition of restricted access, and if so, reject the access of the user equipment; otherwise, allow the access of the user equipment.

15. The wireless access device according to claim 10, wherein the controlling module is configured to determine AOA information corresponding to the user equipment; and control the access of the user equipment according to the location information and the AOA information.

16. The wireless access device according to claim 15, wherein the controlling module is further configured to judge whether the location information and the AOA information all satisfy a condition of restricted access, and if so, reject the access of the user equipment; otherwise, allow the access of the user equipment.

17. The wireless access device according to claim 10, wherein the controlling module is further configured to acquire time calibration information corresponding to the timing advance information, and use the time calibration information to control the access of the user equipment.

18. The wireless access device according to claim 10, wherein the request message includes: an RRC connection establishment request message; a cell updating request message; and a User Registration Area (URA) updating message.

* * * * *